UNITED STATES PATENT OFFICE.

AUGUST STOCK AND FRIEDRICH HEIM, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DYESTUFFS OF THE TRIPHENYLMETHANE SERIES AND PROCESS OF MAKING SAME.

1,065,405.    Specification of Letters Patent.    Patented June 24, 1913.
No Drawing.    Application filed July 23, 1912. Serial No. 711,101.    REISSUED

*To all whom it may concern:*

Be it known that we, AUGUST STOCK, Ph. D., chemist, and FRIEDRICH HEIM, Ph. D., chemist, citizen of the Empire of Germany, residing at Höchst-on-the-Main, Germany, have invented certain new and useful Improvements in Dyestuffs of the Triphenylmethane Series and Processes of Making Same, of which the following is a specification.

As described in our U. S. Patent No. 995494 and in our U. S. patent application Ser. No. 578649 filed 24th August 1910, there are obtained dyestuffs of the triphenylmethane series capable of being subsequently chromed, by heating with an aromatic base the dyestuffs produced by condensing a p-halogenbenzaldehyde, or a substitution-product, thereof with an ortho-oxyarylcarboxylic acid, and subsequently oxidizing the condensation product. For the preparation of these condensation-products, there were hitherto used only o-oxycarboxylic acids having the para-position free, so that the condensation with the aldehyde occurred in para-position to the hydroxyl group. Now according to our present invention one molecule of the said o-oxycarboxylic acid may be replaced by such a molecule wherein the para position is occupied, so that there may be used as parent material asymmetrical condensation-products in which the reaction of the aldehyde with the oxycarboxylic acid has occurred on the one hand in para-position, and on the other hand in ortho-position, to the hydroxyl group of the oxyarylcarboxylic acid. The said parent material has the following general formula:

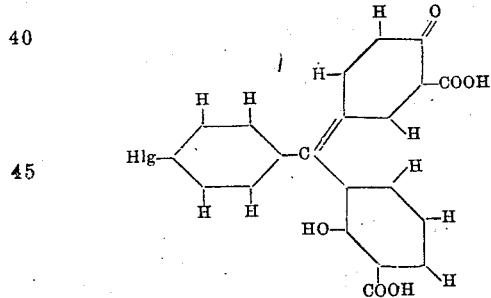

wherein "Hlg" stands for a halogen atom, and wherein the hydrogen-atoms of the nuclei may be substituted. Such acids which are substituted in para-position are, for instance, p-cresotinic acid, p-chlorsalicylic acid, p-chlor-m-cresotinic acid, 2.3-oxynaphthoic acid.

The new dyestuffs have the general formula:

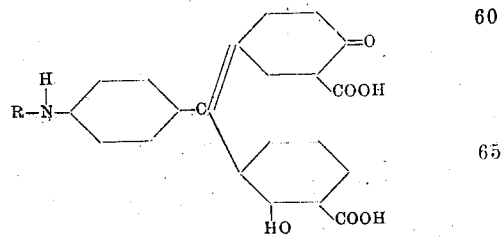

When dry, they form dark powders soluble in caustic alkalis to red to violet-red solutions; on adding acetic acid they are precipitated from these solutions in violet to blue flakes. Their solution in concentrated sulfuric acid is yellowish-red and yields, on adding water, violet to blue flakes.

The dyeings on wool in an acid bath are of a dull grayish-violet tint and when subsequently chromed they turn pure violet to blue; these dyeings are of excellent fastness to washing and milling.

Example: One part of the product, obtained in the usual manner by condensing equal molecular proportions of p-chlorbenzaldehyde, m-cresotinic acid, and p-cresotinic acid and subsequently oxidizing, is heated to 120° C. for ½-1 hour with 5 parts of anilin and one part of anilin hydrochlorid. The mass is then poured into an excess of diluted hydrochloric acid for precipitating the dyestuff which is then filtered, washed and dried. The dyestuff has the formula:

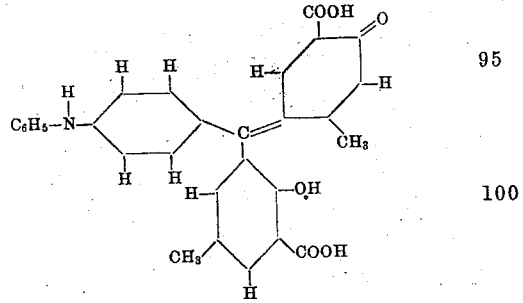

It gives dyeings which, after being chromed, are of a much greener tint than those produced according to U. S. Patent No. 995,494 by the combination of p-chlorbenzaldehyde with 2 molecular proportions of m-cresotinic acid.

Having now described our invention, what we claim is:

1. The process of manufacturing dyestuffs of the triphenylmethane series, capable of being subsequently chromed, which consists in heating with an aromatic base a dyestuff of the general formula:

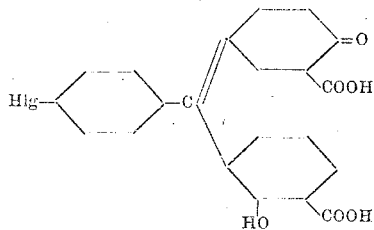

wherein "Hlg" stands for a halogen atom.

2. As new products, the dyestuffs of the formula:

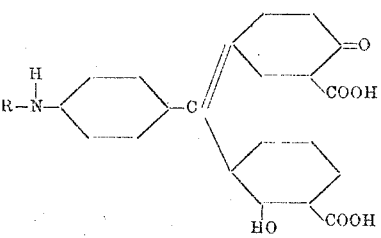

wherein "R" stands for an aryl residue being, when dry, dark powders soluble in caustic alkalis to red to violet-red solutions from which on the addition of acetic acid they are precipitated in violet to blue flakes, their solution in concentrated sulfuric acid being yellowish-red yielding violet to blue flakes on addition of water, dyeing wool dull violet to blue tints and, on being subsequently chromed, pure violet to blue tints of great fastness.

3. As a new product, the dyestuff of the formula:

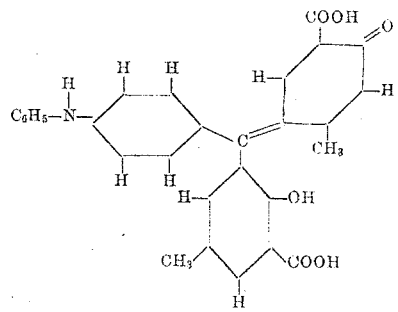

being, when dry, a dark powder soluble in caustic alkalis to red solutions from which on the addition of acetic acid it is precipitated in blue flakes; its solution in concentrated sulfuric acid being yellowish-red yielding blue flakes on addition of water; dyeing wool dull blue tints and, on being subsequently chromed, a pure greenish-blue tures in presence of two witnesses.

In testimony whereof, we affix our signatures in presence of two witnesses.

AUGUST STOCK.
FRIEDRICH HEIM.

Witnesses:
JEAN GRUND,
ROBERT SCHMIDLIN.